(12) United States Patent
Yoon

(10) Patent No.: US 6,168,495 B1
(45) Date of Patent: Jan. 2, 2001

(54) PORTABLE CHILD'S AMUSEMENT AND EDUCATIONAL CENTER AND RELATED ARTICLES

(76) Inventor: Young W. Yoon, 127 Michael Manner, Glenview, IL (US) 60025

( * ) Notice: Under 35 U.S.C. 154(b), the term of this patent shall be extended for 0 days.

(21) Appl. No.: 09/468,548

(22) Filed: Dec. 21, 1999

Related U.S. Application Data

(63) Continuation-in-part of application No. 09/141,946, filed on Aug. 28, 1998.

(51) Int. Cl.$^7$ .................................................. A63H 17/00
(52) U.S. Cl. ................................. 446/478; 446/476
(58) Field of Search ...................... 496/476, 478, 496/487, 7; 434/72, 73, 416

(56) References Cited

U.S. PATENT DOCUMENTS

| | | |
|---|---|---|
| D. 366,511 | 1/1996 | Coddington, Jr. . |
| D. 367,310 | 2/1996 | Ziegler, Jr. et al. . |
| D. 379,209 | 5/1997 | Coddington, Jr. . |
| D. 393,686 | 4/1998 | Coddington, Jr. et al. . |
| 4,556,391 | 12/1985 | Tardivel et al. .................... 446/7 |
| 5,069,623 | 12/1991 | Peat ..................................... 446/476 |
| 5,525,088 | 6/1996 | Mayne ................................. 446/476 |
| 5,733,165 | 3/1998 | Kelley ................................. 446/478 |

FOREIGN PATENT DOCUMENTS 2307173A  11/1996  (GB) .

OTHER PUBLICATIONS

Hammacher Schlemmer Catalog; 22–Foot Configurable Play Maze; Summer, 1998 Catalog; p. 65.
Hammacher Schlemmer Catalog; Pop–Up Play Hut; Summer, 1998 Catalog; p. 64.

*Primary Examiner*—Sam Rimell
(74) *Attorney, Agent, or Firm*—Price Heneveld Cooper DeWitt & Litton

(57) ABSTRACT

A portable child's amusement and educational center comprises a tent suitable for children's play of the type generally having flexible walls supported by a frame and a portal for entering and exiting, and a learning board for educational learning attached to the tent. The learning board is removable and interchangeable, and may contain educational exercises, allow for writing on its surface, or for attachment of alphanumeric characters or figures. The learning board is removably contained in a transparent pocket assembly preferably provided with transparent sub-pockets for containing various children's play articles bearing corresponding indicia.

12 Claims, 2 Drawing Sheets

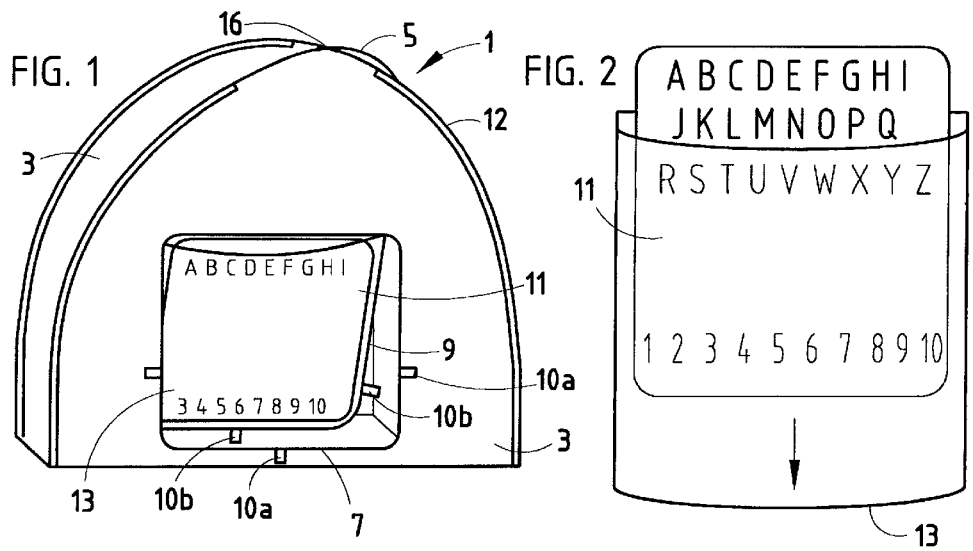
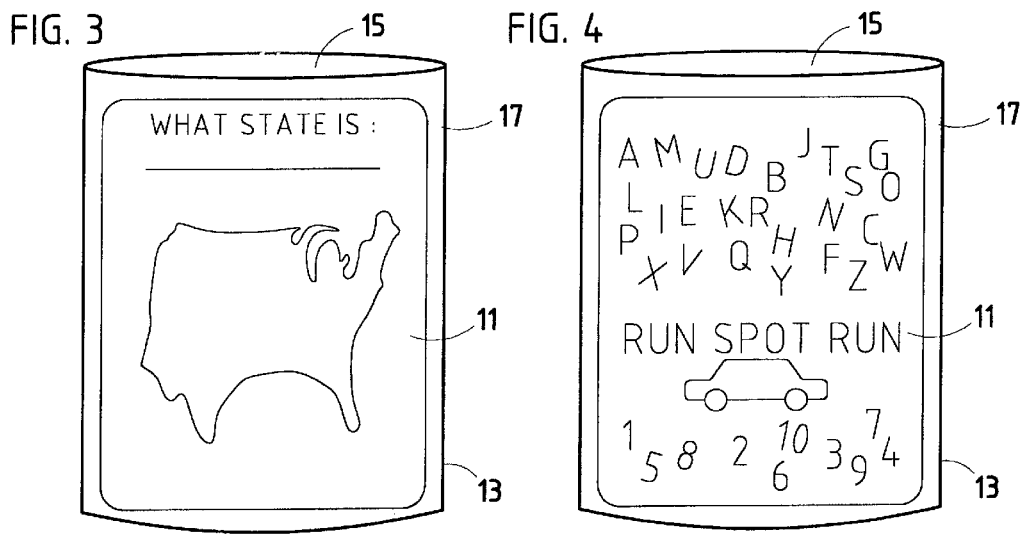
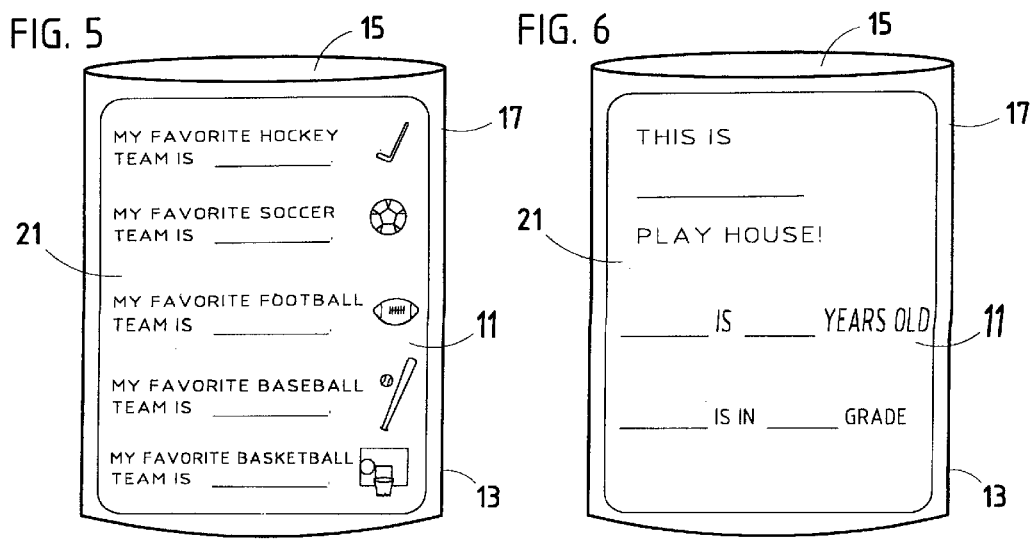

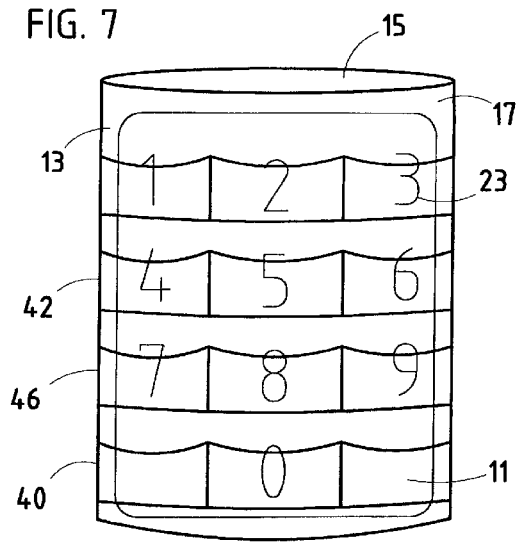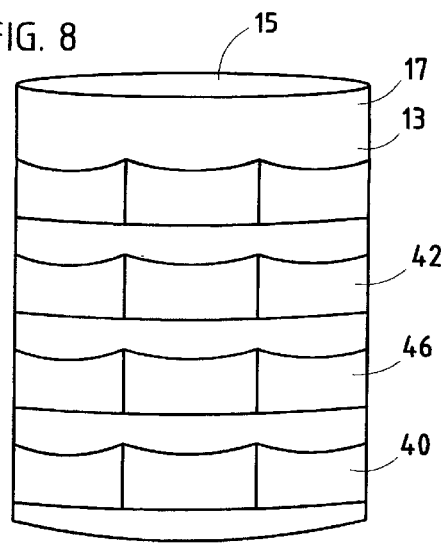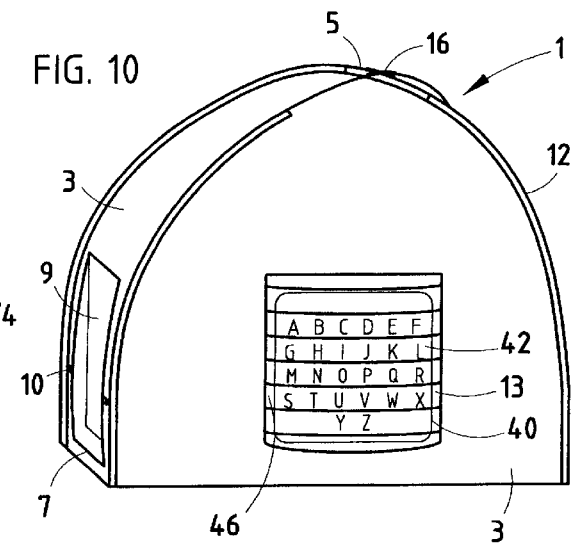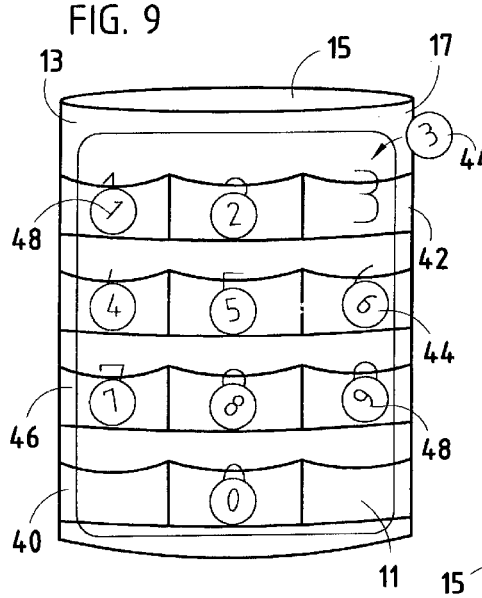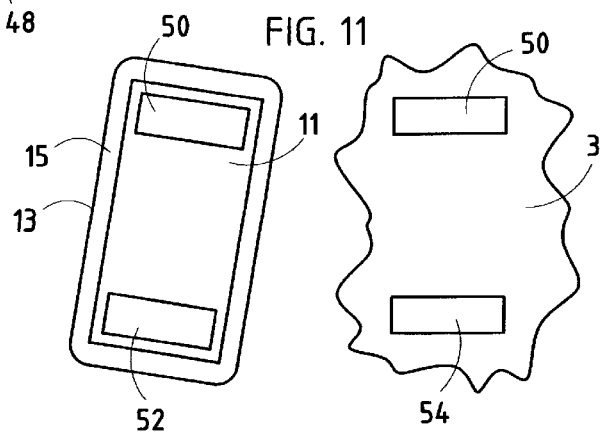

PORTABLE CHILD'S AMUSEMENT AND EDUCATIONAL CENTER AND RELATED ARTICLES

This is a Continuation-in-Part patent application of Patent application Ser. No. 09/141,946, filed on Aug. 28, 1998, for Portable Child's Amusement and Educational Center, issued Jun. 6, 2000 as U.S. Pat. No. 6,071,174.

FIELD OF THE INVENTION

The present invention relates to an improve child's amusement and educational center and articles for use with the same. More particularly, the present invention comprises an improved children's play tent having a pocket attached to the tent for accepting a learning board for amusement as well educational instruction in reading, writing, arithmetic, and the like, and for articles, such as play balls, bearing relevant indicia thereon.

BACKGROUND OF THE INVENTION

Tents, portable structures, and the like have been known for many years. In the recent past, these structures, particularly tents, have been used as children's play things. Often, these tents are small, self supporting, and used indoors for children of ages below 12 as a play area. They may be sized to fit several children, and to house other playthings, such as balls, building blocks, and the like. They assume various colors, patterns, and configurations, such as, for example, a fort.

Although tents in general and children's play tents in particular are known in the art, there are currently no children's play tents that further offer an educational or teaching environment. More particularly, none of the children's tents of the prior art provide interactive stimulation for development of reading, writing, arithmetic, or geography skills.

Therefore, there is an unresolved need for a child's play tent that comprise means for educational or learning opportunities.

SUMMARY OF THE INVENTION

The disadvantages of the prior art are overcome with the present invention which reflects the desirability of providing children with interactive learning stimuli in a play setting in order to encourage children's learning by making it enjoyable to the child. The portable children's amusement and learning center of the present invention generally comprises a tent suitable for children's play, while simultaneously providing opportunities for educational instruction or teaching.

Accordingly, the present invention generally comprises a tent structure of the type suitable for children's play, with a learning board affixed to the tent for educational instruction and exercises. The tent structure of the present invention generally comprises flexible walls of sheetlike material joined together to form enclosure. The walls may be transparent, and are preferably comprised of mesh. Mesh walls allow children within the tent to be supervised while playing and allow the fresh flow of air into and out of the tent structure, thereby minimizing the dangers asphyxiation. The preferred tent further comprises a portal, covered by a door flexible material, in at least one of its walls for entering and exiting the tent interior.

The learning board of the present invention generally comprises a substantially flat board surface for writing upon or for affixing educational figures such as alphanumeric characters. One embodiment of the board may comprise an erasable surface for writing. Another embodiment may comprise a surface and means for removably attaching alphanumeric or other characters or figures thereto, such as via magnets or static electricity. Still another board may comprise figures, questions, and fill in answer blanks for a learning exercise, such as identification of states from a map of the United States.

The preferred embodiment of the invention comprises a series of such interchangeable learning boards, each with a different learning message or exercise. The learning board may be removably attached directly to the tent, or may be contained within a pocket assembly with means for attachment to the tent. The pocket assembly may generally be attached to the tent on any of its interior or exterior walls, on its door interior or exterior, or, preferably, the pocket assembly may comprise the door itself.

A preferred pocket assembly is comprised of a flexible back panel and a flexible front panel joined together about their bottom and side edges to form a pocket accessible through its top. The learning board is removably contained within the preferred pocket assembly. At least the front panel is comprised of a legibly transparent material so that the learning board surface is legible through the pocket assembly front panel. The material comprising the front panel, like the walls, may preferably be plastic mesh or clear plastic material. Attachment means may comprise hooks and loops, snaps, ties, or adhesives.

As noted, the preferred embodiment of the pocket assembly comprises a pocket formed as the door flap of the tent. The preferred door flap comprises a closeable panel covering the tent entrance portal, with the flap hinged at the top. The preferred pocket assembly comprises a front panel generally the same size as and corresponding to the door flap covering the tent portal, and is connected to the flap about its side and bottom edges, thereby forming a pocket accessible through its top edge The learning board is removably contained within the pocket. The pocket top panel is transparent such that the learning board contained therein is legible.

According to the preferred practice of the present invention, the pocket assembly further comprises a plurality of sub-pockets arranged in an array for removably holding children's play articles. The array of the sub pockets may be arranged to superimpose and register with certain indices of the learning boards. For instance, a sub-pocket may be labeled "red ball," via the visible learning board behind it, to indicate a holding place for a corresponding play article comprised of a red ball.

Further, each of the play articles, such as balls, is preferably provided with indicia, such as a printed, raised or embossed number or letter. This indicia corresponds to one or more of the interchangeable learning boards and sub-pockets, such that a child may match the indicia on the article, such as the ball, to the sub-pocket associated with a particular location on the learning board bearing a similar corresponding indicia. Such labeling encourages reading and analytical thought by children.

The above brief description sets forth rather broadly the more important features of the present disclosure so that the detailed description that follows may be better understood, and so that the present contributions to the art may be better appreciated. There are, of course, additional features of the disclosure that will be described hereinafter which form the subject matter of the claims appended hereto. In this respect, before explaining the several embodiments of the disclosure in detail, it is to be understood that the disclosure in not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

The advantages of the present invention have been well established. These advantages and others will become more fully apparent from the following details description when read in conjunction with the accompanying drawings.

BRIEF DESCRIPTION OF THE DRAWINGS

FIG. 1 is a perspective view of a first embodiment of the improved tent of the invention;

FIG. 2 is a view from the front of the pocket assembly of the first embodiment of the invention containing a learning board;

FIGS. 3, 4, 5 and 6 are views of the pocket assembly of the invention containing yet additional learning boards of the invention;

FIG. 7 is a front view of a second embodiment of the pocket assembly of the invention, wherein the preferred pocket assembly is provided with an array of pockets corresponding to the learning board;

FIG. 8 is a front view of the second embodiment of the pocket assembly of the invention, showing the array of pockets;

FIG. 9 is front view of the second embodiment of the pocket assembly of the invention, wherein the array of pockets corresponding to the learning board is provided with play articles bearing indicia corresponding to the learning board;

FIG. 10 is a perspective view of a third embodiment of the improved tent of the invention; and FIG. 11 is a view of the back of the pocket assembly of a third embodiment the invention wherein the pocket assembly is attached to a tent sidewall.

DETAILED DESCRIPTION OF THE INVENTION

The best mode for carrying out the invention is presented in terms of the preferred embodiment, wherein similar reference characters designate corresponding features throughout the several figures of the drawings.

Turning now to the Figures, FIG. 1 shows; a perspective view of a first preferred embodiment of the invention. A portable children's amusement and educational center 1 generally comprises a tent having a plurality of sidewalls 3, a frame 5, and a portal 7 through at least one of the walls 3 for entering and exiting the tent. It is noted that although FIG. 1 shows a structure with four sidewalls, the present invention may comprise a structure having more or fewer sidewalls, assuming, for example, a triangular or octagonal configuration.

Portal 7 has a closeable door flap 9 for covering it. Door flap 9 preferably has means for releasably securing its edges to the portal 7 perimeter, such as hook and loop mating sets 10a, 10b, although other attachment means, such as ties, snaps, zippers or the like may be used. Frame 5 is preferably connected to sidewalls 3 by stitched sleeves 12, and is comprised of a pair of interconnected fiberglass poles attached at each corner of the tent at loops 14, as known in the art, to allow for easy tent erection disassembly, transport, and storage. Preferably, the poles are joined by a connector 16 at the apex of the tent to shorten the frame 5 when stored.

Sidewalls 3 are generally comprised of a lightweight, flexible sheetlike material, and preferably of a mesh material. Mesh composition allows for relative transparency so those children may be visibly observed during play. Mesh also allows for airflow, so that temperature in the tent remains desirably ambient and reducing any possibility of accidental asphyxiation.

The portable children's amusement and learning center further comprises a substantially flat learning board 11, and preferably comprises a plurality of interchangeable learning boards 11. Each learning board 11 is preferably removably held in a pocket assembly 13 attached to the tent. As shown in FIG. 1, the learning board 11 is removably contained in such a preferred pocket assembly 13. The learning boards 11 are preferably interchangeable to provide for different lessons, exercises, and entertainment as required for different children. This allows for the portable learning and amusement center of the present invention to change and grow with the child and thereby to remain useful as a child advances in age, (education, and interests.

FIGS. 2 shows learning board 11 being placed in pocket assembly 13, while FIG. 3 shows another learning board 11 in position. Pocket assembly 13 preferably comprises a back panel 15 and a front panel 17. Back panel 15 and front panel 17 are joined about their side and bottom edges to thereby form a pocket accessible through the open top edge for removably containing message board 11. Front panel 17 is transparent or substantially transparent, such that the indicia on the learning board 11 is legible through it after the learning board is inserted into the pocket. Panel 17 may be comprised of mesh cotton or plastic, or may be comprised of legibly clear plastic sheeting.

FIGS. 3 through 6 show the variety of interchangeable learning boards that may be advantageously applied to the present invention. FIG. 3 shows how geography may be presented, while FIG. 4 shows how removable and movable letters and numbers may be used to form words and simple sentences. FIGS. 5 and 6 show how the learning boards may be personalized for the individual child and the child's interests, with a front surface 21 preferably suitable for erasable writing, to otherwise provide creative input, such as identification of favorite sports teams. Such interact tools desirably stimulate the development of critical and analytical thought in children A relatively limitless variety of interchangeable learning boards 11 are available or may be created. Having such a variety of learning boards is desirable to offer fresh and different educational lessons and instructive exercises to children who may have relatively short attention spans. Further, because the learning boards 11 are freely interchangeable and infinitely customizable, they may be tailored to the particular needs of particular children or applications. For example, various learning boards 11 can be developed for school, home, day care, or hospital applications. Also, different boards 11 may be used for children of different ages and educational advancement, so that the portable play and learning center of the present invention will not become obsolete as a child grows.

FIG. 7 shows a pocket assembly 13 further including a preferred sub-pocket assembly 40 comprising a plurality of sub-pockets 42 arranged in an array for removably containing children's play articles, such as balls 44 or the like. Like the front panel 17, the sub-pockets 42 are transparent or substantially transparent, such that the indicia on the learning board 11 is legible through both the front panel 17 and the sub-pocket 42 after the learning board is inserted into the pocket. Pocket assembly 40 preferably is constructed from a plurality of front panels 46 joined about their side and bottom edges to front panel 17. As depicted in FIG. 7, learning board 11 has writing indicia 23 corresponding to the array of sub-pockets 42. In this manner, when placed in pocket assembly 13, the writing on the learning board 11 is visible immediately beneath the sub-pockets 42 or very close thereto.

Preferred sub-pockets 42 serve several important functions. As the preferred embodiment of the portable children's amusement and learning center of the invention, the sub-pockets 42 are adapted to accept additional play articles, such as balls 44 or the like. Preferably, the play articles, such as balls 44, are each individually and uniquely provided with an indicia 48 corresponding to indicia 23 provided on the learning board 11 located immediately beneath the sub-pocket 42 within which the ball 44 is to be placed. The indicia on the play article 44 can be printed upon or molded into the article as a raised or embossed feature (such as through injection molding). While the indicia 23 is shown as numbers, the indicia 23 on the learning board 11 and the indicia 48 on the ball can be letters or other figures or symbols.

Thus, as depicted in FIGS. 7 and 9, learning board 11 preferably includes writing or indicia 23 in registry with the sub-pockets 42 within which respective play articles 44 are held. Such instructive indicia 23, in combination with corresponding sub-pockets 42, provides further learning opportunities for children, and encourage analytical thinking. Since sub-pockets 42 may be used to hold such various plan articles, they are also useful for organizing the play tent and reducing clatter therein, a shown in FIG. 9.

FIG. 10 shows a third embodiment of the portable amusement and learning center of the invention, with learning board 11 and pocket assembly 13 attached to a tent sidewall 3. The learning board 11 of FIG. 10 utilizes the attachment means 50 as shown in FIG. 8 for attaching board 11 to sidewall 3. FIG. 8 shows the back of the pocket assembly 13 and back panel 15, wherein the pocket 13 is attached to tent sidewall 3 rather than the door 9. Attachment means 50 comprises mating hook and loop pairs 52, 54 attached to the pocket assembly back panel 15 and tent sidewall 3, respectively. Other preferred attachment means may comprise snaps, ties, or the like The advantages of the disclosed portable children's learning and amusement center are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A portable child's amusement and educational center comprising:
   a) a portable enclosure of a flexible sheet-like material having a plurality of abutting and adjacent walls, a support for supporting said walls, a floor attached about its periphery to a lower edge of each of said walls, and a portal through one of said walls for egress and ingress from and into said enclosure;
   b) a substantially flat learning board having educational indicia upon an exposed surface thereof by which a child may be amused and educated; and
   c) a pocket assembly for receiving therein said learning board, said pocket having a front and back panel sealed on each side edge and bottom edge, and having an open upper edge through which said learning board is inserted, said indicia upon said exposed surface of said learning board being visible through said front panel of said pocket assembly when said learning board is inserted in said pocket assembly, said pocket assembly further comprising a plurality of smaller sub pockets situated in front of said front panel through which said indicia of said learning panel is visible, said sub pockets superimposed over and in registration with said indicia of said learning board in said pocket and said sub pockets removably holding children's play articles.

2. The child's amusement and educational center of claim 1, further comprising a closeable door flap having a top, bottom and two side edges removaably covering said portal, said door flap attached along said top edge to said one of said walls, said door flap having fastening means for removably attaching said edges of said door flap to said one of said walls, said fastening means selected from the group consisting of ties, mating hook and loop sets, or snaps.

3. The child's amusement and educational center as in claim 2, wherein said pocket assembly is integral with said door flap.

4. The child's amusement and educational center as in claim 1, wherein said pocket assembly is releasably attached to one of said side walls with fastening means selected from the group consisting of ties, hook and loop mating sets, or snaps.

5. The child's amusement and educational center as in claim 1, wherein said play articles are provided with indicia corresponding to said indicia of said learning board.

6. The child's amusement and educational center as in claim 1 wherein said walls are comprised of a mesh material.

7. The child's amusement and educational center as in claim 1 further comprising a plurality of interchangeable learning boards each having different amusement or educational instruction or exercises.

8. A portable child's amusement and educational center comprises:
   a) a plurality of interchangeable substantially flat learning boards, each having different educational indicia corresponding to instruction or exercises on an exposed surface by which a child may be amused and educated;
   b) a portable enclosure of a flexible sheet like material having a plurality of abutting and adjacent walls, a frame member extending along a side edge of each of said walls for supporting said walls, a floor attached about its periphery to a lower edge of each of said walls, and a portal through one of said walls for egress and ingress from and into said enclosure;
   c) a closeable door flap having a top, bottom and two side edges removably covering said portal, said door flap hingedly attached along said top edge to one of said walls, said door flap having fastening means for removably attaching said edges to said one of said walls, said fastening means selected from the group consisting of ties, mating hook and loop sets, or snaps; and
   d) a pocket assembly for receiving therein said learning board, said pocket attached to said one of said side walls and having a front and back panel sealed on each side edge and bottom edge, and having an open upper edge through which one of said plurality of said learning boards is inserted, said indicia upon said exposed surface of said learning board being visible through said front panel of said pocket assembly when said one of said learning boards is inserted in said pocket assembly, said pocket assembly further comprising a plurality of sub-pockets attached to said pocket assembly situated in front of said front panel through which said indicia of said one of said plurality of learning panels is visible, said sub-pockets superimposed over and registering with said indicia of one of said plurality of said learning board in said pocket.

9. The children's amusement and educational center as in claim 8, wherein each of said subpockets receive a child's play article, said play article being provided with indicia corresponding to said indicia of said learning board.

10. A portable child's amusement and educational center comprising:
   a) a plurality of interchangeable substantially flat learning boards, each having different educational indicia corresponding to instruction or exercises on an exposed surface by which a child may be amused and educated;
   b) a portable enclosure of a flexible sheet like material having a plurality of abutting and adjacent walls, a frame member extending along a side edge of each of said walls for supporting said walls, a floor attached about its periphery to a lower edge of each of said walls, and a portal through one of said walls for egress and ingress from and into said enclosure;
   c) a closeable door flap having a top, bottom and two side edges removably covering said portal, said door flap hingedly attached along said top edge to one of said walls, said door flap having fastening means for removably attaching said edges to said one of said walls, said fastening means selected from the group consisting of ties, mating hook and loop sets, or snaps,
   d) a pocket assembly for receiving therein one of said plurality of said learning boards, said pocket assembly attached to one of said walls, said pocket being sealed on each side edge and bottom edge, and having an open upper edge through which said one of said plurality of said learning boards is inserted, and
   e) a plurality of sub-pockets attached to said pocket assembly, said sub-pockets disposed in front of said front panel through which said indicia of said learning panel is visible and superimposed over and registering with said indicia of said one of said plurality of said learning boards in said pocket.

11. The child's amusement and educational center as in claim 10, wherein said pocket assembly is integral with said door flap.

12. The child's amusement and educational center as in claim 10, wherein said pocket assembly is releasably attached to one of said side walls with fastening means selected from the group consisting of ties, hook and loop mating sets, or snaps.

* * * * *

UNITED STATES PATENT AND TRADEMARK OFFICE
CERTIFICATE OF CORRECTION

PATENT NO. : 6,168,495 B1
DATED : January 2, 2001
INVENTOR(S) : Young W. Yoon

It is certified that error appears in the above-identified patent and that said Letters Patent is hereby corrected as shown below:

Column 1,
Line 15, "as well" should be -- as well as --;
Line 39, "comprise" should be -- comprises --;
Line 58, before "enclosure" insert -- an --;
Line 63, after "door" insert -- of --;

Column 2,
Line 58, after "similar" insert -- or --;

Column 3,
Line 2, "in not" should be -- is not --;
Line 13, "details" should be -- detailed --;
Line 42, after "embodiment" insert -- of --;

Column 4,
Line 26, before "education" delete "(";
Line 47, "interact" should be -- interactive --;

Column 5,
Line 36, "plan" should be -- play --;
Line 50, after "like" insert -- . (period) --;

Column 6,
Line 23, "removaably" should be -- removably --;
Line 47, "comprises" should be -- comprising --.

Signed and Sealed this

Eleventh Day of December, 2001

*Attest:*

*Attesting Officer*

NICHOLAS P. GODICI
*Acting Director of the United States Patent and Trademark Office*